US010334296B2

(12) United States Patent
Barton

(10) Patent No.: US 10,334,296 B2
(45) Date of Patent: Jun. 25, 2019

(54) REAL-TIME DVR USAGE AND REPORTING SYSTEM

(71) Applicant: TiVo Solutions Inc., San Carlos, CA (US)

(72) Inventor: James M. Barton, Los Gatos, CA (US)

(73) Assignee: TIVO SOLUTIONS INC., San Jose, CA (US)

( * ) Notice: Subject to any disclaimer, the term of this patent is extended or adjusted under 35 U.S.C. 154(b) by 36 days.

(21) Appl. No.: 15/414,362

(22) Filed: Jan. 24, 2017

(65) Prior Publication Data

US 2017/0208351 A1    Jul. 20, 2017

Related U.S. Application Data

(63) Continuation of application No. 15/049,446, filed on Feb. 22, 2016, now Pat. No. 9,565,459, which is a continuation of application No. 14/159,212, filed on Jan. 20, 2014, now Pat. No. 9,271,040, which is a continuation of application No. 12/190,519, filed on Aug. 12, 2008, now Pat. No. 8,634,703.

(51) Int. Cl.
| | |
|---|---|
| H04N 21/242 | (2011.01) |
| H04N 21/472 | (2011.01) |
| H04N 21/488 | (2011.01) |
| H04N 21/4147 | (2011.01) |
| H04N 21/437 | (2011.01) |
| H04N 21/442 | (2011.01) |
| H04N 21/454 | (2011.01) |

(Continued)

(52) U.S. Cl.
CPC .......... *H04N 21/242* (2013.01); *H04N 5/76* (2013.01); *H04N 5/782* (2013.01); *H04N 21/4147* (2013.01); *H04N 21/4302* (2013.01); *H04N 21/437* (2013.01); *H04N 21/44204* (2013.01); *H04N 21/44222* (2013.01); *H04N 21/4542* (2013.01); *H04N 21/4627* (2013.01); *H04N 21/4751* (2013.01); *H04N 21/47202* (2013.01); *H04N 21/47214* (2013.01); *H04N 21/4882* (2013.01); *H04N 21/643* (2013.01); *H04N 21/6582* (2013.01); *H04N 5/765* (2013.01)

(58) Field of Classification Search
CPC ............. H04N 21/242; H04N 21/4147; H04N 21/4302; H04N 21/437; H04N 21/44204; H04N 21/44222; H04N 21/4542; H04N 21/4627; H04N 21/47202; H04N 21/47214; H04N 21/4751; H04N 21/4882; H04N 21/643; H04N 21/6582; H04N 5/76; H04N 5/765; H04N 5/782
USPC .............. 386/291, 299, 261; 725/34, 50, 54; 709/217; 718/104
See application file for complete search history.

(56) References Cited

U.S. PATENT DOCUMENTS

| | | | | |
|---|---|---|---|---|
| 7,689,995 B1 * | 3/2010 | Francis | .............. | H04N 21/4147 718/104 |
| 7,870,264 B2 * | 1/2011 | Clark | .................... | H04L 67/24 709/224 |

(Continued)

*Primary Examiner* — Thai Q Tran
*Assistant Examiner* — Stephen R Smith
(74) *Attorney, Agent, or Firm* — Haley Guiliano LLP

(57) ABSTRACT

Techniques for real-time DVR usage and reporting enable using instant message protocol in a DVR environment to obtain real-time DVR usage data and to report data reflecting such usage in real-time. An example of DVR usage data comprises data reflecting that a viewer is viewing a video program which is R-rated. Another example of DVR usage data comprises a viewer entering a password, such as a kids zone password, to exit kids zone operational mode.

20 Claims, 15 Drawing Sheets

(51) Int. Cl.
*H04N 21/4627* (2011.01)
*H04N 21/475* (2011.01)
*H04N 21/658* (2011.01)
*H04N 5/76* (2006.01)
*H04N 5/782* (2006.01)
*H04N 21/43* (2011.01)
*H04N 21/643* (2011.01)
*H04N 5/765* (2006.01)

(56) References Cited

U.S. PATENT DOCUMENTS

| | | | | |
|---|---|---|---|---|
| 2006/0062544 | A1* | 3/2006 | Southwood | H04N 5/782 |
| | | | | 386/231 |
| 2006/0064721 | A1* | 3/2006 | Del Val | H04N 5/44543 |
| | | | | 725/41 |
| 2006/0277272 | A1* | 12/2006 | Cantalini | H04N 5/782 |
| | | | | 709/217 |
| 2007/0092204 | A1* | 4/2007 | Wagner | H04N 5/782 |
| | | | | 386/241 |
| 2007/0171921 | A1* | 7/2007 | Wookey | G06F 3/1415 |
| | | | | 370/401 |
| 2007/0218912 | A1* | 9/2007 | Song | H04L 63/0272 |
| | | | | 455/445 |
| 2009/0074380 | A1* | 3/2009 | Boston | G11B 19/00 |
| | | | | 386/295 |
| 2010/0031296 | A1* | 2/2010 | Elias | H04N 7/17318 |
| | | | | 725/54 |

* cited by examiner

500

Choose Age Range

In order to tailor Kids Zone content for your children, please pick the age range most appropriate for your household. This will set ratings limits and create a Kids Channel List. (You can edit this list later in Kids Zone Settings.)

Under 4 years old  501

Ages 4 to 7 years old  502

Ages 7 to 12 years old  503

600

Select Password

Using the number buttons on your remote control, enter a four-digit password to use to exit Kids Zone.

Kids Zone Enabled

Kids Zone is now enabled and can be entered from the Now Playing List. You can further customize which shows will or will not appear in Kids Zone by selecting "Add shows to Kids Zone" within Kids Zone, and by changing the Kids Zone option on individual Program screens.

If the TiVo DVR has been unused for four hours it will automatically return to Kids Zone. To exit Kids Zone you will need to enter the password you just set up.

Press SELECT to continue

800

Now Playing List

- Kids Zone  801
- Bob the Builder — Sat 4/14
- Thomas & Friends — Thu 4/12
- DragonTales (3) — Mon 4/9
- Caillou (2) — Sun 4/8
- CSI: New York — Sat 4/7
- Simpsons, The (2) — Wed 4/4
- South Park (2) — Wed 4/4

900

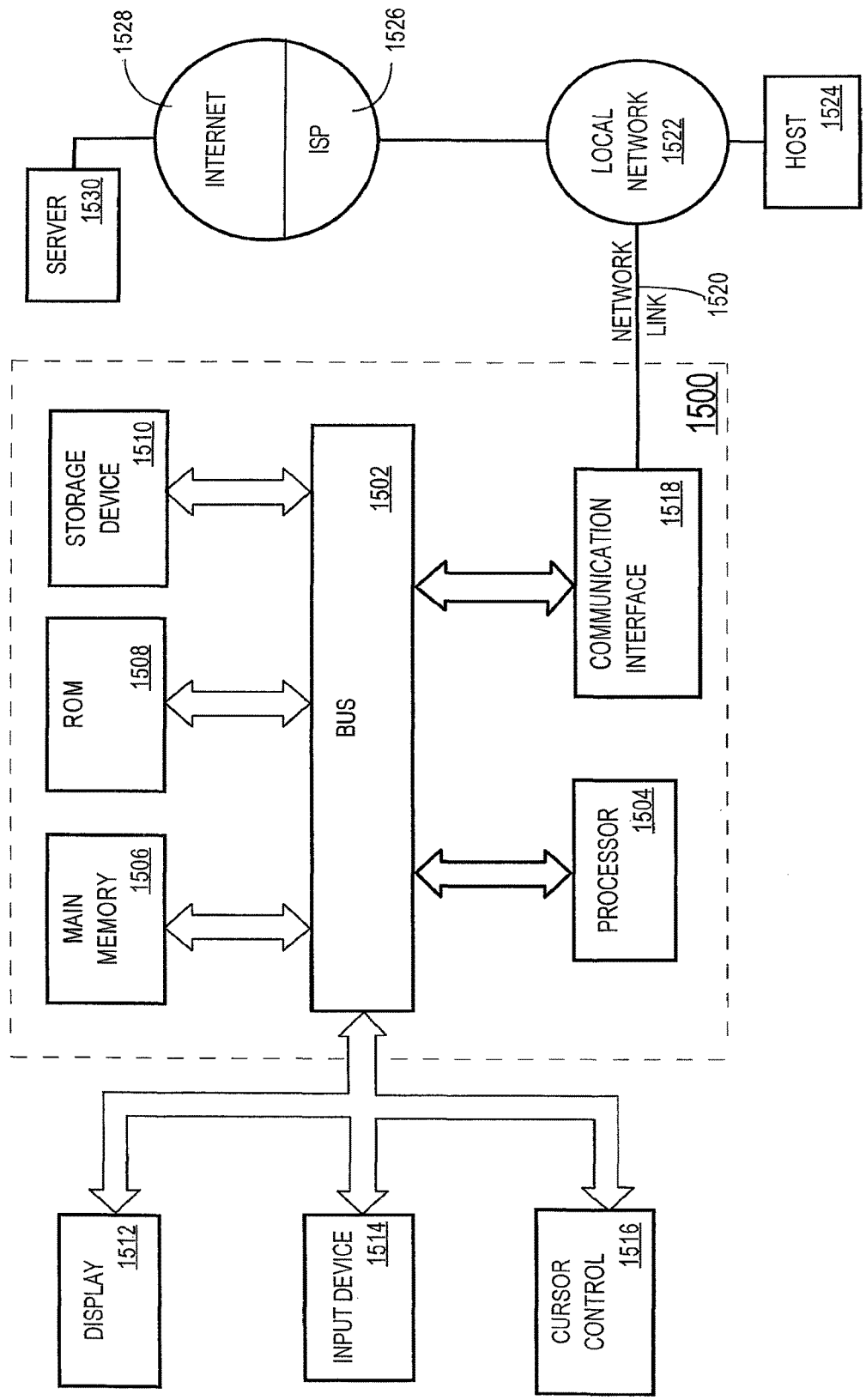

REAL-TIME DVR USAGE AND REPORTING SYSTEM

CROSS-REFERENCE TO RELATED APPLICATIONS

This application is a continuation of U.S. patent application Ser. No. 15/049,446, filed Feb. 22, 2016, now allowed, which is a continuation of U.S. patent application Ser. No. 14/159,212, filed Jan. 20, 2014, now issued as U.S. Pat. No. 9,271,040, which is a continuation of U.S. patent application Ser. No. 12/190,519, filed Aug. 12, 2008, now issued as U.S. Pat. No. 8,634,703, each of which is hereby incorporated by reference herein. This application is related to U.S. patent application Ser. No. 12/347,897 entitled, "Real-Time DVR Programming," filed Dec. 31, 2008, which is incorporated by reference in its entirety as if fully set forth herein.

FIELD OF TECHNOLOGY

The present invention relates to digital video recorders ("DVRs"). The invention relates more specifically to a real-time DVR usage and reporting system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the Digital Video Recorder (DVR) to the consumer world has revolutionized the way viewers watch and record television programs. DVRs eliminate the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals as input from cables or satellite dishes, (or, in some cases, unlike VCRs, from broadband network connections) and also output television signals to a television set or other display.

At least one such DVR automatically records several television programs in advance of the time that a user will watch those television programs. After one or more television programs have been recorded and stored on a hard drive, the DVR presents, to the user, through the television set, a user interface that identifies the television programs which currently are available for viewing. This user interface comprises a menu that allows the user to select, using a remote control device for the DVR, one of the currently recorded television programs. In DVRs produced by TiVo Inc., this menu is often called the "now playing" menu.

After a user selects a recorded television program, the DVR plays the selected television program to the user by reading the appropriate digital recording from the hard drive and sending a corresponding signal to the television set. While the television program is being played to the user, the DVR also receives signals from the user's remote control. Through the remote control, a user may instruct the DVR to perform various operations relative to the television program. For example, the user may instruct the DVR to play the television program backward for a desired period of time ("rewind"). The user may play the television program forward with greater than usual speed ("fast forward"). The user may play the television program forward with slower than usual speed. The user may cause the currently displayed video frame of the television program to be displayed indefinitely ("pause"), or stop the playing of the television program entirely. In this manner, the user may temporally traverse the television program however the user likes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 illustrates an example of a DVR-presented screen that explains that the DVR has been placed into a kids zone operational mode, according to an embodiment;

FIG. 15 is a block diagram that illustrates a computer system upon which an embodiment may be implemented.

DETAILED DESCRIPTION OF EXAMPLE EMBODIMENTS

A method and apparatus for real-time DVR usage and reporting is described. In the following description, for the purposes of explanation, numerous details are set forth in order to provide a thorough understanding of the present invention. It will be apparent, however, that the present invention may be practiced without such details. In other instances, well-known structures and devices are shown in block diagram form in order to avoid unnecessarily obscuring the present invention.

Structural Overview

Figure 1A:
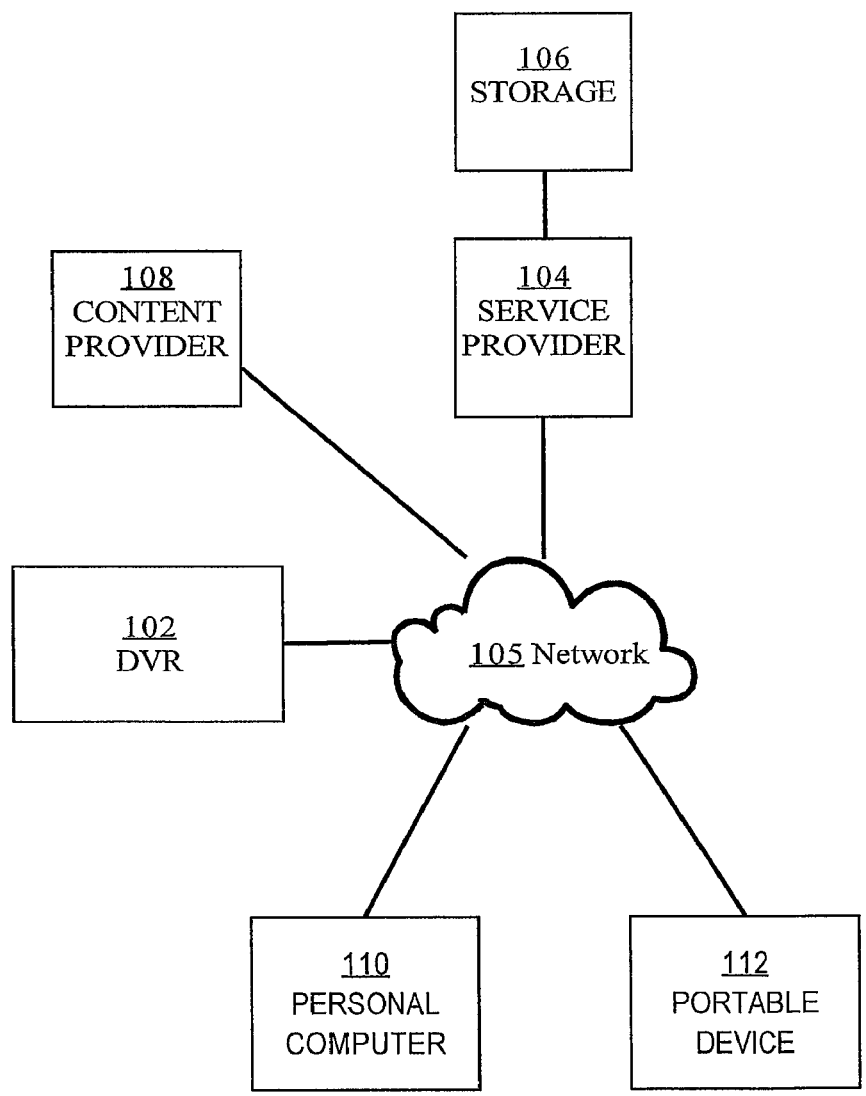
FIG. 1A is a block diagram illustrating a network with content and service providers for a DVR, according to an embodiment.

FIG. 1A illustrates a network with content and service providers for a DVR, according to an embodiment. The system comprises DVR 102 which is communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider server ("service provider") 104, storage 106 for service provider 104, content provider 108, personal computer 110 and portable device 112.

Personal computer 110 may be a personal computing device, such as a desktop computer or laptop computer, and is also coupled to network 105 through any communications interface, including wireless. Portable device 112 may be any handheld computing device, cellular phone, portable media player, or any other portable device capable of displaying multimedia content and is also coupled to network 105 through any communications interface, including wireless. DVR 102, personal computer 110, and portable device 112 each communicate as client with service provider server 104 through network 105. In an embodiment, DVR 102, personal computer 110, and portable device 112 each communicate with content provider 110 through network 105. Storage 106 may be internal to service provider 104 (not shown) or external to service provider 104 as shown.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In an embodiment, content provider 108 provides broadcast program content to DVR 102 via cable, satellite, terrestrial communication, or other transmission method. Broadcast program content may include any multimedia content such as: audio, image, or video content. In an embodiment, content provider 108 provides multimedia content, such as any downloadable content, through network 105 to DVR 102, personal computer 110, or portable device 112.

In an embodiment, DVR 102 communicates with service provider 104 and storage 106, which provide program guide data, graphical resources (such as fonts, pictures, etc.), service information, software, advertisements, event identification data, and other forms of data that enable DVR 102 to operate independently of service provider 104 to satisfy user interests.

In an embodiment, content provider 108 may provide, to service provider 104, content data or any metadata, including promotional data, icons, web data, and other information. Service provider 104 may then interpret the metadata and provide the content data metadata to DVR 102, personal computer 110, or portable device 112.

Figure 1B:
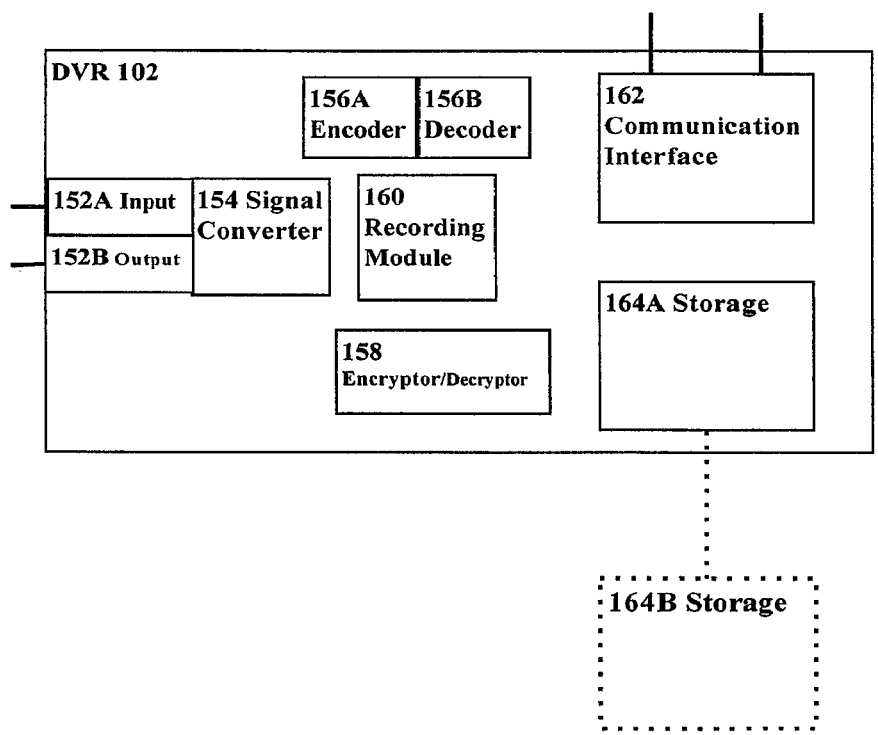
FIG. 1B is a block diagram illustrating a general overview of the components of a Digital Video Recorder (DVR), according to an embodiment.

Referring to FIG. 1B, in an embodiment, DVR 102 generally comprises one or more components, signified by signal converter 154, that may be used to digitize an analog television signal and convert it into a digital data stream or accept a digital data stream. An example of the internal structure and operation of a DVR is further described in U.S. Pat. No. 6,233,389.

DVR 102 receives broadcast signals from an antenna, from a cable TV system, satellite receiver, etc., via input 152A. Input 152A may comprise one or more tuning modules that allow one or more signals to be received and recorded simultaneously. For example, a TV input stream received by input 152A may take the form of a National Television Standards Committee (NTSC) compliant signal or a Phase Alternating Line (PAL) compliant broadcast signal. For another example, a TV input stream received by input 152A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 152A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 152A and passed to the other modules as if the signals had been delivered via an MPEG-2 private data channel.

Recording module 160 records the incoming data stream by storing the digital data stream on at least one storage facility, signified by storage 164A/164B that is designed to retain segments of the digital data stream. Storage 164A/164B may be one or more non-volatile storage devices (e.g., hard disk, solid state drive, USB external hard drive, USB external memory stick, USB external solid state drive, network accessible storage device, etc.) that are internal 164A and/or external 164B. A signal converter 154 retrieves segments of the data stream, converts the data stream into an analog signal, and then modulates the signal onto a RF carrier, via output 152B, through which the signal is delivered to a standard TV set. Output 152B may alternatively deliver a digital signal to a TV set or video monitor. For example, DVR 102 may utilize a High-Definition Multimedia Interface (HDMI) for sending digital signals to a TV via a HDMI cable.

DVR 102 also includes a communication interface 162, through which the DVR 102 communicates with network 105 via Ethernet, wireless network, modem, or other communications standard. Further, DVR 102 may be integrated into a TV system such that the components described above are housed in a TV set capable of performing the functions of each component of DVR 102.

In another embodiment, DVR 102 generally comprises one or more components necessary to receive, record, store, transfer and playback digital data signals from one or more sources, such as a PC, a DVR, a service provider, or content server. DVR 102 can transfer digital data signals to another DVR or PC. DVR 102 may encode or decode digital signals via encoder 156A and decoder 156B into one or more formats for playback, storage or transfer. According to one embodiment, encoder 156A produces MPEG streams. According to another embodiment, encoder 156A produces streams that are encoded using a different codec. Decoder 156B decodes the streams encoded by encoder 156A or streams that are stored in the format in which the streams were received using an appropriate decoder. DVR 102 can also encrypt or decrypt digital data signals using encryptor/decryptor 158 for storage, transfer or playback of the digital data signals.

In one embodiment, DVR 102 communicates with service provider 104, which provides program guide data, graphical resources such as brand icons and pictures, service information, software programs, advertisements, and other forms of data that enable DVR 102 to operate independently of the service provider 104 to perform autonomous recording functions. Communication between DVR 102 and service provider 104 may use a secure distribution architecture to transfer data between the DVR 102 and the service provider 104 such that both the service data and the user's privacy are protected.

DVR Synchronization with Service Provider by Polling

An embodiment of DVR synchronization with service provider 104 by polling may be described with respect to FIG. 1A and FIG. 1B. Storage 164A/164B of DVR 102 comprises program guide data, season pass data, wish list data, now playing data, to do data (e.g., what programs are scheduled), suggestions data, etc. Storage 106 of service provider 104 also comprises a copy of such data for DVR 102. For example, storage 106 comprises one or more databases, which comprise tables that are associated with DVR 102. As well, storage 106 comprises copies of all other DVR clients (e.g., as data stored in tables associated with each of the other DVR clients), which service provider 104 supports and with which service provider 104 communicates (not shown). DVR 102 periodically establishes a Secure Sockets Layer (SSL) connection to and contacts ("polls") service provider 104 to initiate synchronization between data stored in storage 164A/164B of DVR 102 and data stored in storage 106 of service provider 104. Synchronization between data stored in storage 164A/164B of DVR 102 and data stored in storage 106 of service provider 104 as used herein means causing data stored in storage 164A/164B of DVR 102 and data stored in storage 106 to represent the same content. For example, in an embodiment, DVR 102 contacts service provider 104 via network 105 to synchronize every fifteen minutes. In an embodiment, synchronization is achieved by DVR 102 contacting service provider 104 and sending a subset of local data in storage 164A/164B, e.g., data that reflects updates to the local data stored in storage 164A/164B, to service provider 104 that stores the data on storage 106. In another example, a viewer, from the viewer's PC 110, adds a new season pass for a series, such as The War, to the viewer's collection of season passes. In this example, the viewer, from the viewer's PC 110, adds the new season pass for the series by causing PC 110 to send data related to adding the season pass to service provider 104, which then stores the data in the appropriate table(s) associated with the viewer's DVR 102 in the database on storage 106. When DVR 102 initiates synchronizing data with service provider 104, data reflecting the newly added season pass contained in storage 106 is sent to DVR 102. It should be appreciated that DVR/service provider synchronization is not limited by which element (e.g., DVR 102 or service provider 104) initiates synchronization and sends updated data to the receiving element. For example, DVR 102 may initiate synchronization or service provider 104 may initiate synchronization. As another example, the particular element (e.g., DVR 102 or service provider 104) designated to initiate the synchronization process may be the result of a business or design decision.

An example DVR/service provider synchronization process is as follows. A user is logged onto the internet (e.g., network 105) using personal computer 110. For example, the user is navigating the TiVo Central™ Online web page and, from the TiVo Central™ Online remote scheduling facility, schedules a program to record on the user's DVR 102. The message to record the program gets sent from the web page interface on personal computer 110 to service provider 104. The program information is added to the database tables associated with the user's DVR 102 by service provider 104, e.g., on storage 106 comprising data that represents the schedule of programs for user's DVR 102. The next time that DVR 102 and service provider 104 synchronize data, data reflecting the schedule with the added program is sent by service provider 104 from storage 106 to DVR storage 164A/164B. DVR 102 is thus configured to record the added program according to the user's request.

Instant Message Protocol

Figure 2A:
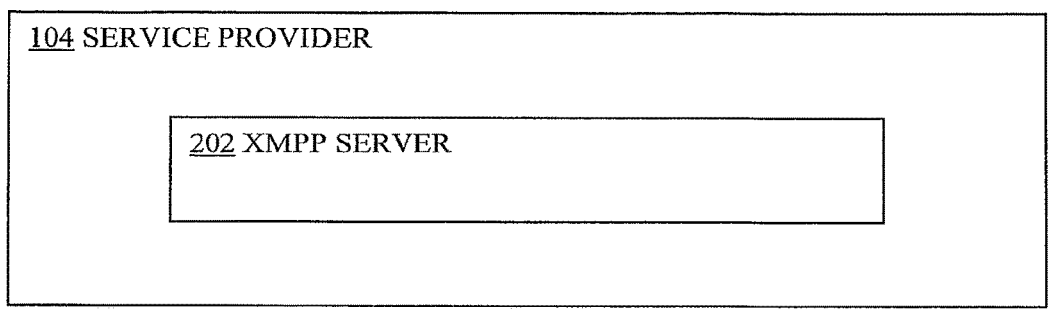
FIG. 2A is a block diagram illustrating service provider comprising an XMPP server internally, according to an embodiment.
Figure 2B:
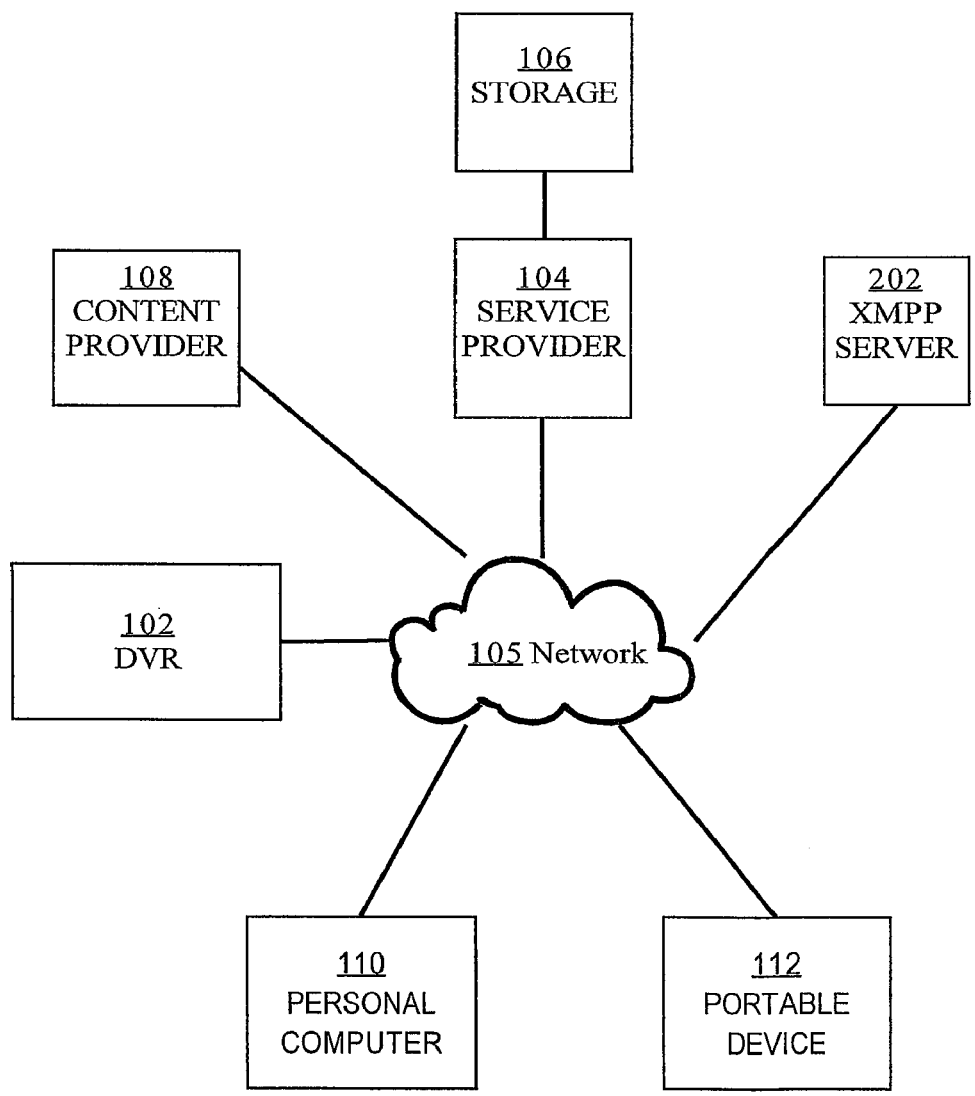
FIG. 2B is a block diagram illustrating XMPP server residing externally to service provider, according to an embodiment.

In an embodiment, DVR 102, personal computer 110, portable device 112, or any other appropriately configured device, may communicate with service provider 104 on network 105 using a secure client-server instant message protocol to transfer data between DVR 102, personal computer 110, portable device 112, or any other appropriately configured device and service provider 104 such that both the service data and the user's privacy are protected. In an embodiment, data may be transferred using secure client-server instant message communications protocol over network 105 via wired, wireless, or any other communication interface. In an embodiment, DVR 102 receives and sends instant messages through communication interface 162. As an example, on a cell phone, a user might select a program to be recorded and the request to record the program is sent as an instant message to service provider 104. Instant message communication between DVR 102, personal computer 110, or portable device 112 and service provider may be described with reference to FIG. 2A and FIG. 2B. FIG. 2A is a block diagram of service provider 104 comprising an Extensible Messaging and Presence Protocol (XMPP) server 202 internally. In an embodiment, XMPP server 202 is communicatively connected to network 105 and external to service provider 104, as shown in FIG. 2B. It should be appreciated that in an embodiment, any system configured for instant message communications protocol may be contemplated and that any embodiment described herein using XMPP is meant by way of example and is not meant to be limiting. For example AOL Instant Messenger (AIM®), Microsoft's Windows Live, ICQ®, or Short Messaging Services (SMS) are each a system that may be used for instant message communications protocol in accordance with one or more embodiments. In an embodiment, commands from any of DVR 102, personal computer 110, or portable device 112 are sent via network 105 to service provider 104 as instant messages. After receipt of such instant messages, service provider 104 updates appropriate database tables in storage 106 that are associated with the user associated with the command. As an example, in an embodiment, after receipt of one or more instant messages containing information relating to a particular update to a user's DVR, service provider 104 updates appropriate database objects in central site database 100, as described in the commonly owned U.S. Pat. No. 6,728,713, titled, "Distributed Database Management System," dated Apr. 27, 2004, which is incorporated herein in its entirety as if fully set forth herein. It should be appreciated that such configurations are by way of example only and are not meant to be limiting.

In an embodiment, XMPP is an open source protocol for real-time extensible instant messaging (IM) over a network as well as presence information, such as used for buddy lists. XMPP is based on open standards, similar to email. Similar to a user in an open email environment, a user in an open XMPP environment with a domain name and a suitable Internet connection may run an XMPP server and communicate directly with users on other XMPP servers. An example client XMPP application is Google Talk. Google Talk is a Windows application for Voice over IP and instant messaging, offered by Google®.

An example XMPP message delivery process from UserA to UserB is as follows. UserA sends a message intended for UserB to UserA's XMPP server. If UserB is blocked on UserA's server, then the message is dropped. Otherwise, UserA's XMPP server opens a connection to UserB's XMPP server. An embodiment of the opened connection may include obtaining authorization and obtaining an encrypted connection. After the connection is established, UserB's XMPP server checks if UserA is blocked on UserB's XMPP server. If UserA is blocked on UserB's XMPP server, the message is dropped. In an embodiment, if UserB is not presently connected to UserB's XMPP server, the message is stored for later delivery. It should be appreciated that other options apply, such as dropping the message. In an embodiment, if UserB is presently connected to UserB's XMPP server, the message is delivered to UserB. It should be appreciated that in an embodiment, UserA's server and UserB's server are the same server. For instance, UserA sends instant messages to UserB and receives instant messages from UserB by sending messages to and receiving messages from an XMPP server and UserB sends instant messages to UserA and receives messages from UserA by sending messages to and receiving messages from the XMPP server.

Further details on example structure and functionality of XMPP may be found in The Internet Society's "Request For Comment" (RFC) documents RFC3920, "Extensible Messaging and Presence Protocol: Core" and RFC3921, "Extensible Messaging and Presence Protocol: Instant Messaging and Presence."

Instant Message Synchronization

In an embodiment, DVR 102 is an instant messaging client and hosts an instant message client application. DVR 102 attempts to maintain an instant messaging connection with instant message XMPP server 202 at all times. Service provider 104 is also an instant messaging client and hosts an instant message client application. As well, service provider 104 attempts to maintain an instant messaging connection with instant message XMPP server 202 at all times. In an embodiment, DVR 202, XMPP server 202, and service provider 104 communicate according to open standard XMPP protocol, e.g., as described above. In an embodiment, service provider 104 comprises related software that enables service provider 104 to communicate with storage 106. It should be appreciated that in certain contexts herein, references to service provider 104 is used in the collective sense and is meant to include reference to the related software that manages storage 106.

Figure 3A:
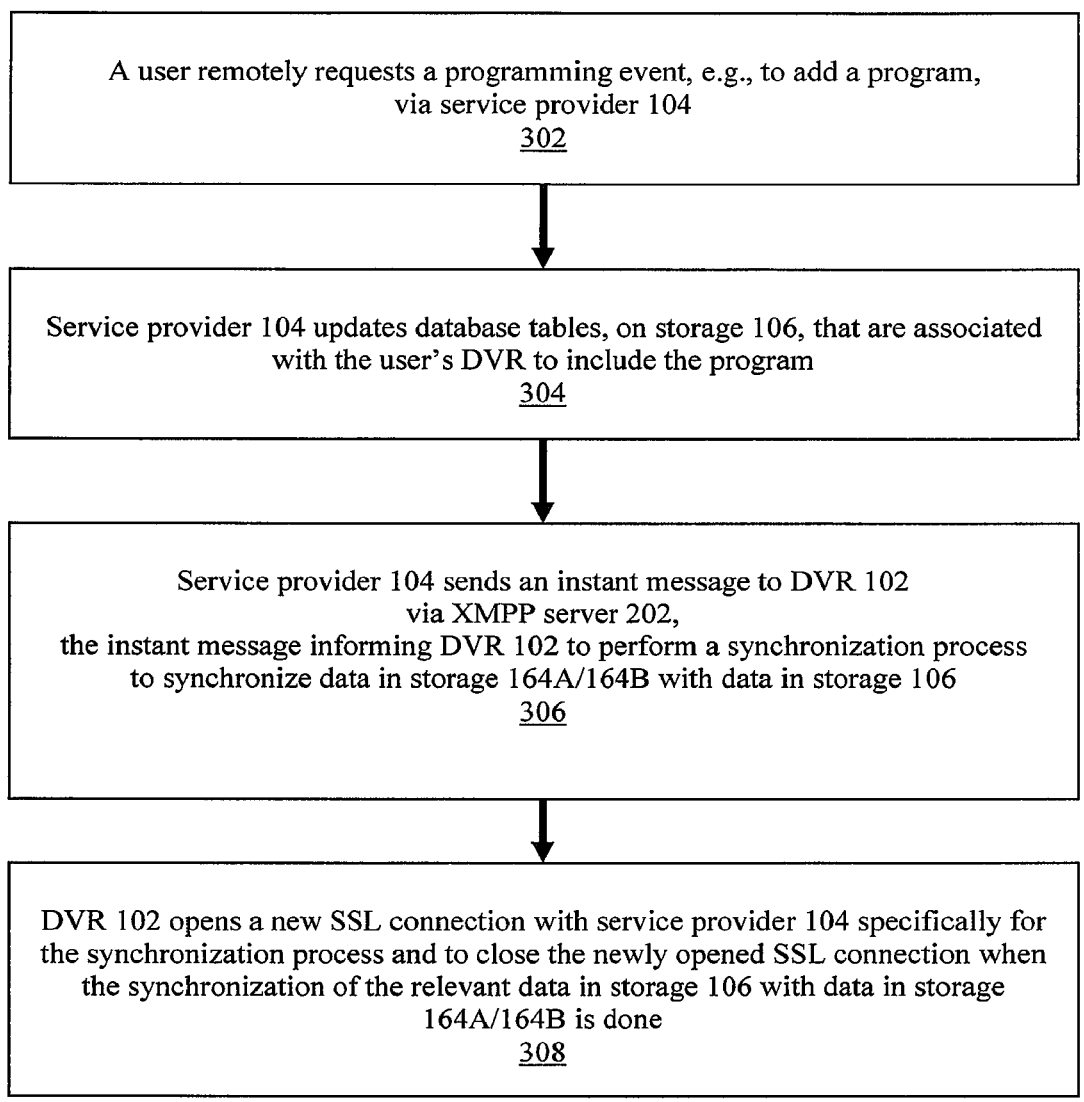
FIG. 3A is a flow diagram showing an example DVR/service provider synchronization process flow, according to an embodiment.

An embodiment of instant message synchronization may be described with reference to FIG. 3A. FIG. 3A is a flow diagram showing an example DVR/service provider synchronization process flow. This example synchronization process flow begins with a user remotely requesting a programming event, e.g., to add a program, via service provider 104 (Step 302). For example, PC 110 may request to add a program to the user's schedule of recordings for DVR 102. For example, through PC 110 the user may remotely add a program using TiVo Central™ Online through service provider 104. Service provider 104 updates database tables on storage 106 that are associated with the user's DVR to include the program (Step 304.) As well, service provider 104 sends an instant message to DVR 102 via XMPP server 202 (Step 306.) It should be appreciated that, in an embodiment, DVR 102 attempts to maintain the connection to XMPP server 202 at all times, reconnecting automatically whenever the connection drops. Similarly, it should be appreciated that, in an embodiment, service provider 104 attempts to maintain the connection to XMPP server 202 at all times, reconnecting automatically whenever the connection drops. In either case, when the connection to XMPP server 202 is not up for any reason, the instant message is discarded. In the example, the instant message informs DVR 102 that a change has been made to the database tables that are associated with the user's DVR in storage 106 and requests that DVR 102 synchronize data in storage 164A/164B with data in storage 106. In an embodiment, the notification causes DVR 102 to open a new SSL connection with service provider 104 specifically for the synchronization process and to close the newly opened SSL connection when the synchronization of the relevant data in storage 106 with data in storage 164A/164B is done (Step 308.) It should be appreciated that certain details in the example are by way of illustration only and are not meant to be limiting. As an example, while a remote user requests a change via PC 110, the request for change may be sent from any configurable device, such as portable device 112.

Figure 3B:
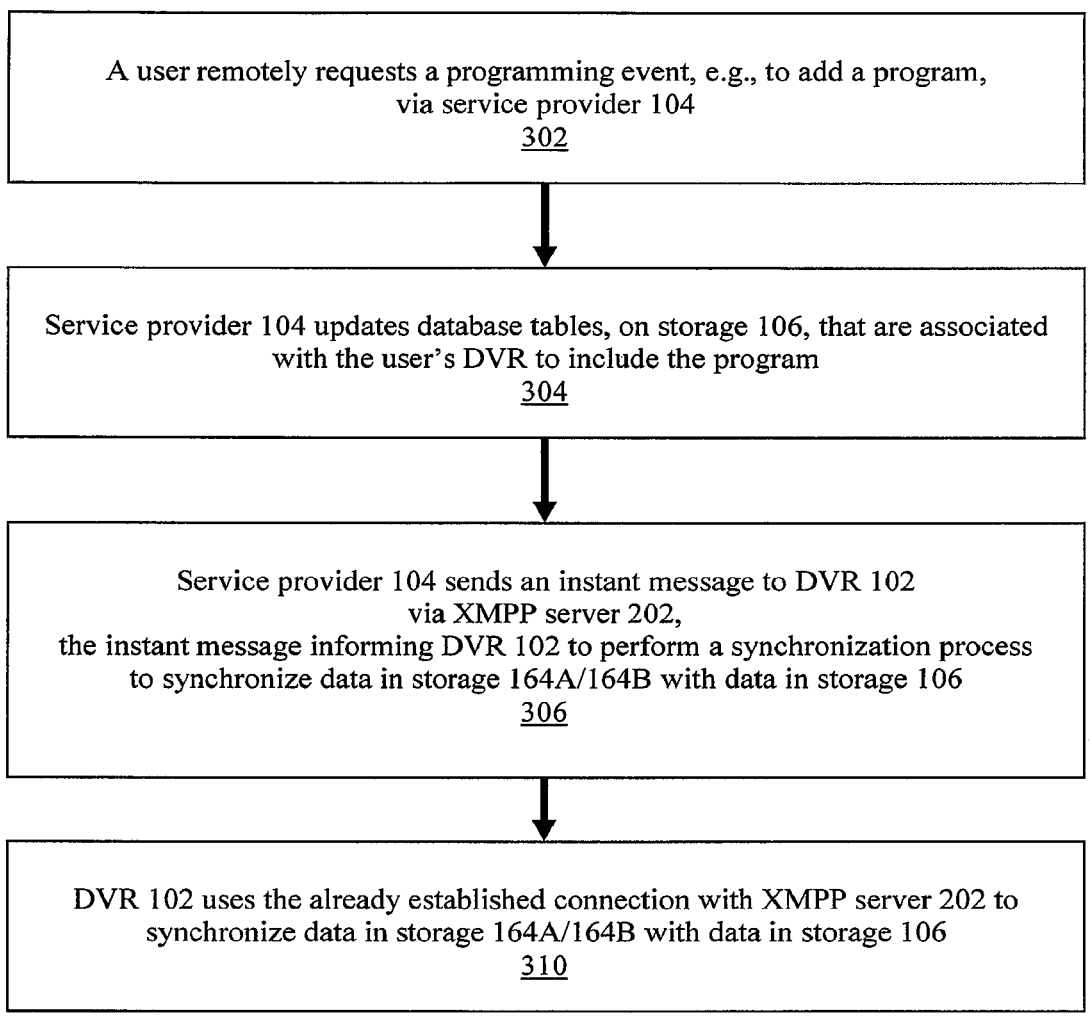
FIG. 3B is a flow diagram showing an example DVR/service provider synchronization process flow, according to an embodiment.

Another embodiment of DVR/service provider synchronization may be described with reference to FIG. 3B. FIG. 3B is a flow diagram showing an example DVR/service provider synchronization process flow that is similar to FIG. 3A, however with a different last step. As in FIG. 3A, the example synchronization process flow of FIG. 3B begins with a user remotely requesting a programming event, e.g., to add a program, via service provider 104 (Step 302.) For example, PC 110 requests the service to add a program to the user's schedule of recordings for DVR 102. For example, through PC 110 the user may remotely add a program using TiVo Central™ Online through service provider 104. Service provider 104 updates database tables on storage 106 that are associated with the user's DVR to include the program (Step 304.) As well, service provider 104 sends an instant message to DVR 102 via XMPP server 202 (Step 306.) It should be appreciated that, in an embodiment, DVR 102 attempts to maintain the connection to XMPP server 202 at all times, reconnecting automatically whenever the connection drops. Similarly, it should be appreciated that, in an embodiment, service provider 104 attempts to maintain the connection to XMPP server 202 at all times, reconnecting automatically whenever the connection drops. In either case, when the connection to XMPP server 202 is not up for any reason, the instant message is discarded. In the example, the instant message informs DVR 102 that a change has been made to the database tables that are associated with the user's DVR in storage 106 and requests that DVR 102 synchronize data in storage 164A/164B with data in storage 106. Responsive to the message, DVR 102 uses the already established connection with XMPP server 202 to pass and/or receive the synchronization data to synchronize data in storage 164A/164B with data in storage 106 (Step 310). It should be appreciated that certain details in the example are by way of illustration only and are not meant to be limiting. For instance, while, in the example, a remote user requests a change from PC 110, the request for change may be sent from any configurable device, such as portable device 112.

It should be appreciated that client-server instant message protocol in a DVR environment is not limited to synchronizing schedule-related and recording-related data. Indeed, any type of data stored in storage 106 of service provider 104 may be synchronized with data stored in DVR storage 164A/164B and any type of data stored in DVR storage 164A/164B may be synchronized with data stored in storage 106 of service provider 104.

As well, through an instant message connection, data reflecting any type of activity from any client may be sent to the service provider storage on a real-time basis. The type of and use of such gathered data is limitless. For example, the data may be aggregated and analyzed for marketing or towards providing better customer service. As another example, data gathered for a particular user may be used to initiate a customized or targeted process for that particular user, and so forth.

Scalability and Robustness

In an embodiment, the DVR attempts to maintain an SSL connection with an XMPP server at all times, reconnecting whenever the connection is dropped. Because the DVR maintains the SSL connection with the XMPP server, the DVR has the capability to use instant messaging at all times, except during those short intervals when the connection is temporarily dropped. For example, the DVR may employ an already established connection with the XMPP server to perform the synchronization with the service provider. Thus, the DVR using the established connection to perform synchronization provides scalability.

In another embodiment, one or more XMPP servers are configured not to store messages that are sent to any of the one or more XMPP servers. For example, an XMPP server receives an XMPP message and passes the XMPP message on to a recipient, such as the DVR, without using additional XMPP server resource for storing the message. Because the one or more XMPP servers may not need to use additional resource to store XMPP messages, more XMPP server resource may be used at a given time for processing more messages, thus providing greater scalability.

In an embodiment, DVR/service provider synchronization via instant messaging is robust because the DVR and service provider automatically reconnect after any connection failures during the synchronization process.

In another embodiment, DVR/service provider synchronization is rendered robust by a configuration that uses a combination of DVR/service provider synchronization by polling and DVR/service provider synchronization by instant messaging. For example, an administrator may set DVR/service provider synchronization by polling to operate every twenty-four hours, while DVR/service provider synchronization by instant messaging is operable as well. The combination of synchronization by polling and synchronization by instant messaging renders a robust synchronization feature. For example, suppose that an XMPP server crashes at the time that the XMPP server is attempting to send a message to a DVR, e.g., a request to synchronize, and that the crash causes the sending of the message to fail. In an embodiment, the DVR may be updated from the synchronization by polling process, possibly at a later time. Thus, synchronization is successful and robust even in a case, which may be rare, when an XMPP message is lost.

Real-Time DVR Usage and Reporting System

In an embodiment, instant message protocol in a DVR environment, such as described above, is used to cause the DVR to respond by sending an instant message, e.g., to inform a user, such as a parent or employer, when particular activities have been or are being performed on the DVR. For example, a viewer under a certain age who is watching an R-rated program may cause the DVR to send a notification instant message to a parent. As another example, the DVR may send an instant message when the DVR starts to record a particular program or media content, where the instant message contains an indication of the particular program or media content. As well, the DVR may send another instant message when the DVR stops recording the particular program or media content. Another example can be illustrated using Kid Zone, a feature described in further detail below. In this example, entering a Kid Zone password to exit Kid Zone operational mode, e.g., when a child figures out and enters the Kid Zone password, may cause the DVR to notify a parent. In an embodiment, the DVR on which a particular activity is performed may send an instant message through the network to another DVR on the network, another server on the network, a PC, a portable device, such as a cell phone, personal digital assistant (PDA), laptop, and so forth. For example, a young person in one room in a house who is viewing a program in Kid Zone operation on a particular DVR may enter the Kid Zone password to exit Kid Zone. The particular DVR may send a notification instant message indicating that the password was or is being entered to a second DVR which resides in another room in the house and on which a parent is viewing a video program. As another example, when a particular activity has been performed on the DVR, the DVR may send an instant message to a database server (e.g., service provider 104) causing the database server to add or update a particular entry in the database that is associated with the particular activity being performed on the DVR. As well, when a particular activity has been performed on the DVR, the DVR may send an instant message to cause a server to make an entry in a log file that is associated with the particular activity being performed on the DVR. The various applications of real-time DVR usage and reporting are limitless.

Figure 4:
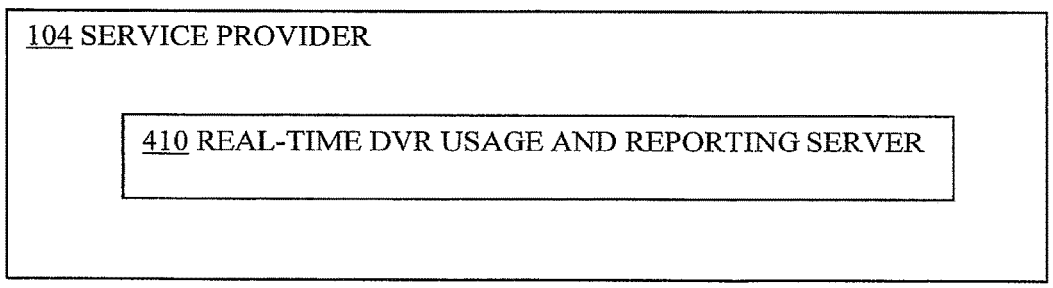
FIG. 4 is a schematic diagram showing a real-time DVR usage and reporting module in a service provider server, according to an embodiment.

In an embodiment, real-time DVR usage and reporting is implemented using the instant message connection as transport protocol described hereinabove (e.g., refer to FIG. 2B) in conjunction with a real-time DVR usage and reporting server, e.g. real-time DVR usage and reporting server 410 as depicted in FIG. 4. It should be appreciated that real-time DVR usage and reporting server 410 is not required to reside within service provider 104 and could reside anywhere on network 105. In an example, in response to a particular activity being performed on DVR 102, DVR 102, which already has a secure connection to XMPP server 202, sends an instant message through XMPP server 202 that is intended for real-time DVR usage and reporting server 410. When certain conditions are met, for example, when DVR usage and reporting server 410 is not blocked from communication with XMPP server 202 and the authentication and encryption connection between XMPP server 202 and real-time DVR usage and reporting server 410 has already been established, XMPP server 202 sends the instant message to real-time DVR usage and reporting server 410. After receiving the instant message, real-time DVR usage and reporting server 410 may gather data about the particular DVR usage in real-time and may perform post-processing on the data in accordance with business rules and processes, and so on. It should be appreciated that certain details in the example are by way of illustration only and are not meant to be limiting.

In an embodiment, in response to real-time DVR usage and reporting server 410 receiving one or more instant messages that a particular activity is being performed on DVR 102, real-time DVR usage and reporting server 410 may look up a rules association table and may use the results of the look-up to compute a next step. For example, in an embodiment, a next step may comprise logging the activity in a log file or making an entry in database where the entry is associated with the particular activity. As another example, in an embodiment, a next step may comprise sending a corresponding notification message in real-time to another DVR on network 105, to portable device 112, to personal computer 110, or to a third party component on network 105. Examples of notification message formats are a message to a DVR, an email to an email account on a personal computer or portable device, an instant message to a personal computer, portable device, or DVR, and a text message to a personal computer, personal device, or DVR. For example, real-time DVR usage and reporting server 410 may use informational data from the instant message and proceed to open a rules file comprising a list of rules real-time DVR usage and reporting server 410 is to follow. For instance, a rule from the list of rules may cause real-time DVR usage and reporting server 410 to send a text message reflecting the particular DVR usage to a parent's cell phone. For example, the parent might receive a text message saying, "Your DVR has exited kids zone operational mode." As another example, a rule from the list of rules may cause real-time DVR usage and reporting server 410 to send an instant message reflecting the particular DVR usage to a parent's instant message application running on the parent's personal computer. For example, the parent might receive an instant message saying, "Your DVR is playing a program that is R-rated." In an embodiment, real-time DVR usage and reporting server 410 may follow instructions from more than one rule. For example, real-time DVR usage and reporting server 410 might send out both a text message to the parent's cell phone and an instant message to the parent's instant message application on the parent's personal computer, as well as make an entry in a log file. It should be appreciated that these examples are for illustrative purposes only and are not meant to be limiting.

An Example—Entered Password Detection in Real-Time Using TiVo® KidZone

In an embodiment, a viewer viewing a video program on a TiVo® DVR enters a password to exit TiVo® KidZone and such DVR usage activity is detected. Upon detecting that a viewer entered a password to exit TiVo® KidZone, a notification is reported, e.g., a notification email message is sent to the parent's email account.

TiVo® KidZone

Details of TiVo® KidZone are described in the commonly owned U.S. patent application Ser. No. 11/713,242, titled, "Customizing DVR Functionality," filed Mar. 1, 2007, which is incorporated herein in its entirety as if fully set forth herein. Techniques of TiVo® KidZone enable parents to establish a child-protective "kids zone" on a DVR. According to one technique, a DVR receives, from a parent, identities of content items that the parent does not want children to view. The DVR maps the identities to a kids zone. During times that the DVR is set to operate in the kids zone operational mode, the DVR prevents itself from presenting any content items that are associated with the identities. However, during these times, the DVR still may obtain and store these content items. At other times, during which the DVR is not set to operate in the kids zone operational mode, the DVR may allow itself to present the content items that are associated with the identities, including content items that the DVR obtained and stored but could not display during times that the DVR was set to operate in the kids zone operational mode.

Figure 5:
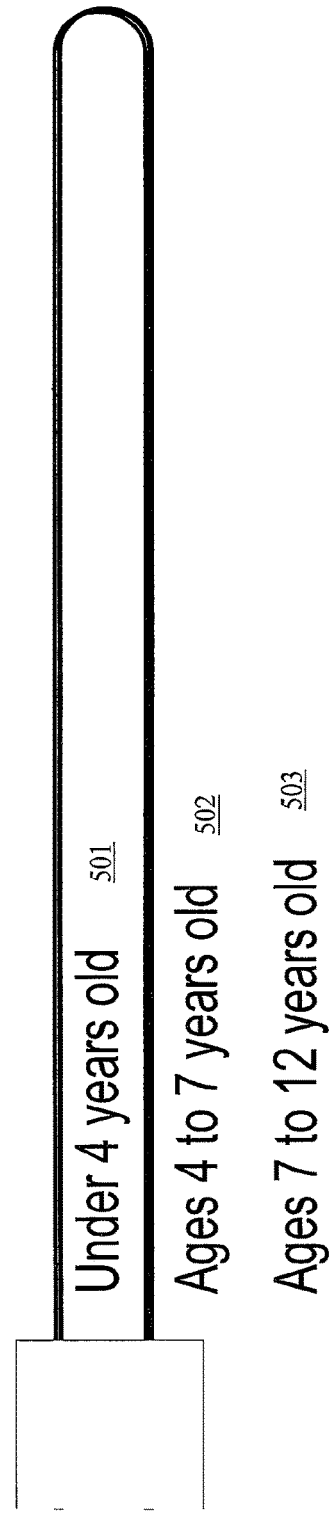
FIG. 5 illustrates an example of a DVR-presented screen that provides a mechanism by which parents can configure a kid zone with pre-set default settings that are directed toward preventing content that is unsuitable for children of certain age groups, according to an embodiment.
Figure 6:
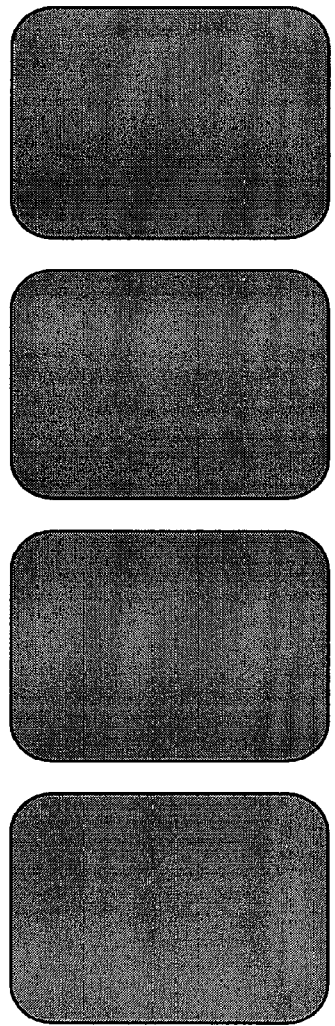
FIG. 6 illustrates an example of a DVR-presented screen that provides a mechanism by which a parent can supply a password, according to an embodiment.

In an embodiment, DVR 102 presents a screen to a viewer (e.g., parent) by which the parent may configure a kid zone with pre-set default settings that are directed toward preventing content that is unsuitable for children of certain age groups. An example of such DVR-presented screen is shown in FIG. 5, on which screen a parent selects an age range for the kids zone 500. In the example shown, there is a first menu item for "ages under 4 years" 501, a second menu item for "ages 4 to 7 years" 502, and a third menu item for "ages 7 to 12 years" 503. After a parent has selected an age range for the kids zone, DVR 102 requests a new password from the parent. FIG. 6 illustrates an example of a DVR-presented screen 600 that provides a mechanism by which a parent can supply a password, according to an embodiment. In the example illustrated, the parent uses the DVR remote control to enter a four-digit password. Any time that the DVR has been placed in the kids zone operational mode, the parent enters a password when the parent wishes to place the DVR into an operational mode other than the kids zone. The secrecy of the password prevents children from exiting the kids zone and from changing the settings thereof.

Although the example illustrated is described with reference to a four-digit password, other embodiments may ask for and use, instead, passwords of other lengths and compositions. For example, the password might be any number of digits and/or alphanumeric characters. In another example, the password might be formed by the pressing of parent-selected buttons on the DVR remote control in a parent-selected sequence. In another embodiment, a technique for authenticating to DVR 102 for entering into and out of kids zone operational mode may include other types of technologies that are appropriately configured. For example such other types of technologies may include smartcard, voice recognition, or fingerprint technologies. For instance, instead of entering a four-digit password, a user may slide a smartcard into a slot in front of the DVR. It should be appreciated that such implementations are meant by way of example only and are not meant to be limiting.

In an embodiment, after the parent has supplied to DVR 102 an age range and a password for the kids zone, a kids zone is established. DVR 102 maps the restriction criteria to the kids zone and stores the mapping. However, at this point, DVR 102 may not be placed into the kids zone operational mode. FIG. 7 illustrates an example of a DVR-presented screen 700 that explains that the kids zone has been established, according to an embodiment. The illustrated screen explains that the kids zone has been established and instructs the parent on how to place the DVR into the newly established kids zone operational mode. The illustrated screen informs the parent that the DVR may be placed into the kids zone operational mode via selection of a particular menu item in the "now playing" list (which is accessible via selection of a certain menu item on a main menu). The illustrated screen also informs the parent that the kids zone settings (such as which content DVR 102 can present while the DVR is in the kids zone operational mode) can be modified by following a specified procedure.

Additionally, in an embodiment, the screen 700 explains that the DVR will automatically place itself back into the kids zone operational mode after a specified period of time (in this example, four hours) has passed during which the DVR's controls have not been used (either via the DVR remote or the DVR's on-surface console). In an embodiment, this "auto-relock" feature may be disabled by following a specified process.

Figure 8:
FIG. 8 illustrates an example of a DVR-presented screen that includes a menu item whose selection causes the DVR to enter the kids zone operational mode, according to an embodiment.

In an embodiment, after the kids zone has been established and created on DVR 102 as described above, a menu item, the selection of which causes DVR 102 to place itself into the kids zone operational mode, appears in the DVR's general "now playing" list. FIG. 8 illustrates an example of a DVR-presented screen that includes a menu item the selection of which causes the DVR to enter the kids zone operational mode, according to an embodiment. The screen illustrated in FIG. 8 shows the titles of content (e.g., television video programs) that DVR 102 has obtained and stored (e.g., by recording the content as the content was broadcast, or by downloading the content over network 105) for later presentation. Above such titles, the illustrated screen 800 shows a "Kids Zone" menu item 801. A user's selection of this menu item causes DVR 102 to place itself into the kids zone operational mode. Once DVR 102 has been placed into the kids zone operational mode, the content that DVR 102 may present, which may include some of the content that DVR 102 has already obtained and stored, may become unavailable for presentation until DVR 102 has been placed back into the general, unrestricted operational mode, or unless the previously established password is supplied to override, temporarily, the restrictions imposed in the kids zone.

Figure 9:
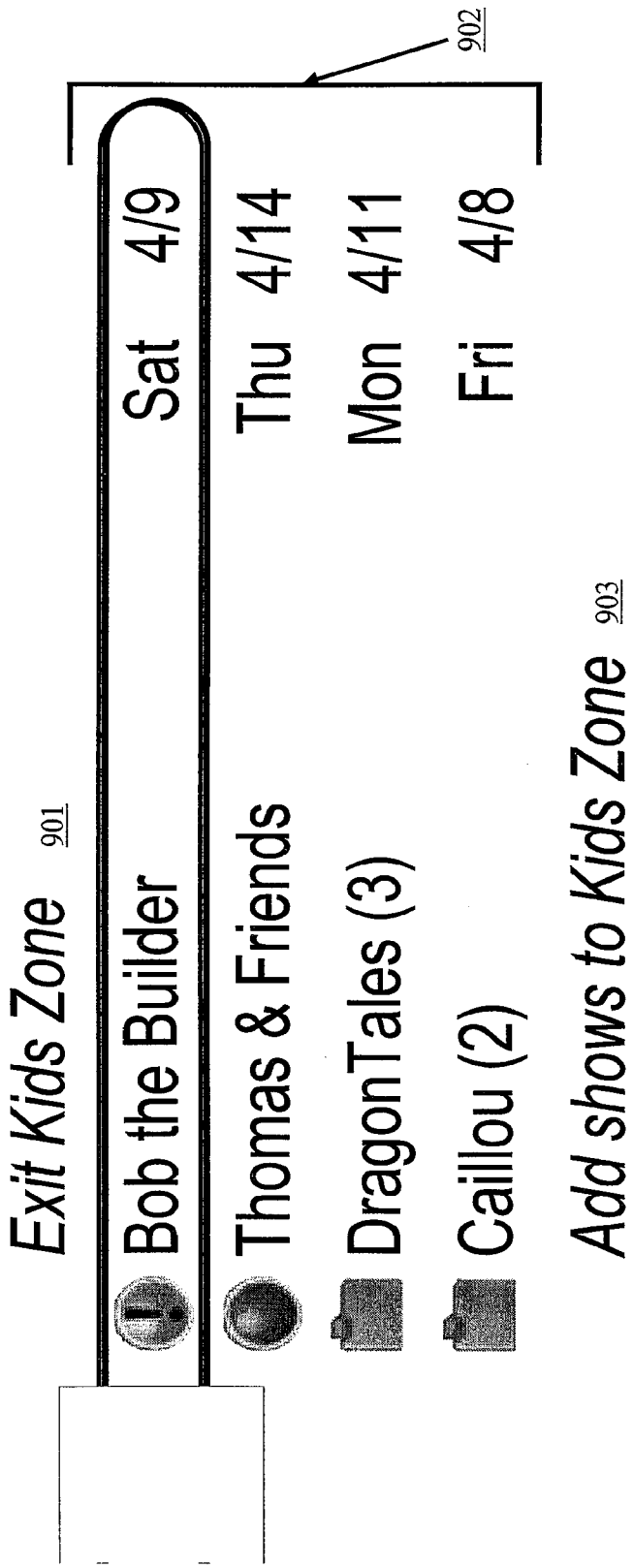
FIG. 9 illustrates an example of a DVR-presented screen that shows only content items that are allowed by the restriction criteria that are associated with the kids zone, according to an embodiment.

FIG. 9 illustrates an example of a DVR-presented screen 900 that shows only content items that are allowed by the restriction criteria that are associated with the kids zone 902, according to an embodiment. In contrast to the general "now playing" list of FIG. 8, the "kids zone now playing" list 900 of FIG. 9 omits, from the list, all of the content items, the attributes and characteristics (e.g., title, rating, category, channel or URL from which obtained, etc.) of which fail to satisfy the restriction criteria that are associated with the kids zone. For example, although content items such as "Bob the Builder," "Thomas & Friends," "DragonTales," and "Caillou" remain in the "kids zone now playing" list of FIG. 9, other content items such as "CSI: New York," "The Simpsons," and "South Park," which appeared in the general "now playing" list of FIG. 8, are not shown in the "kids zone now playing" list. The latter content items are omitted from the "kids now playing" list because, for whatever reason, they do not satisfy the restriction criteria that are associated with the kids zone. These latter content items are still stored on DVR 102, but, in an embodiment, they are not accessible from DVR 102 while DVR 102 is in the kids zone operational mode.

The example screen shown in FIG. 9 also includes an "Exit Kids Zone" menu item 901 and an "add shows to kids zone" menu item. In an embodiment, user selection of the "exit kids zone" menu item 901 causes DVR 102 to prompt the DVR's user for the previously established password. Submission of the correct password in response to the prompt causes DVR 102 to exit the kids zone and place itself into the general, unrestricted operational mode, at least temporarily. Similarly, in an embodiment, user selection of the "add shows to kids zone" menu item 903 also causes DVR 102 to prompt the DVR's user for the previously established password. Submission of the correct password in response to the prompt causes DVR 102 to initiate a process through which the DVR's user can modify the restriction criteria that are associated with the kids zone. In an embodiment, submission of an incorrect password in response to a prompt does not allow exit from or alteration of the kids zone.

Entered Password Real-Time Reporting Process

Figure 10:
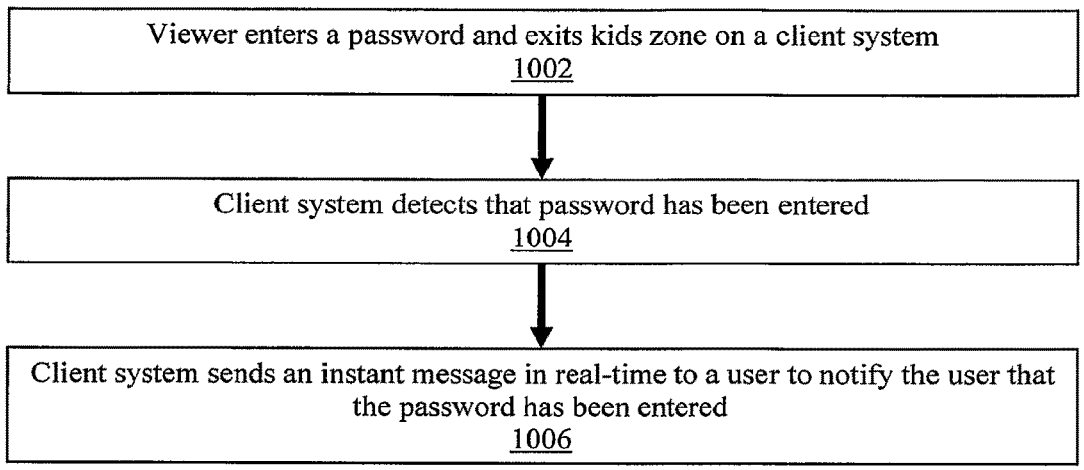
FIG. 10 is a flow diagram of a password detecting and reporting process according to an embodiment.

In an embodiment, submission of the correct password causes a client system (e.g., DVR 102) to initiate a process for notifying or reporting to a user in real-time that the correct password has been entered. Referring to FIG. 10, a flow diagram of a password detecting and reporting process according to an embodiment, a viewer enters a password and exits a first operation mode (e.g., kids zone) on a client system (Step 1002). Upon detecting that the correct password has been submitted (Step 1004), the client system sends an instant message in real-time to a user (e.g., a parent) to notify the user that the password has been entered (Step 1006). It should be appreciated that the viewer may perform any activity for which the client system is configured to detect and that the activity is not limited to entering a password. It should be appreciated that the client system may be configured to detect any type of change, such as switching from a first operational mode into a second operational mode. For example, DVR 102 may be configured to detect exiting out of kids zone and into standard operation mode. It should be appreciated that the client system may send an instant message in real-time to another client system (e.g., a second DVR), a personal computer, a portable device, or to a server. For example, DVR 102 may send an instant message in real-time to a parent viewing a video program on a second DVR which is configured to display a notification message in response to receiving the instant message. In another example, DVR 102 may send an instant message in real-time to a parent's cellular phone that is configured to receive the instant message and alert the parent (e.g., by making a sound or vibrating) that the password has been entered. It should be appreciated that such illustrations are by way of example only and are not meant to be limiting.

Figure 11:
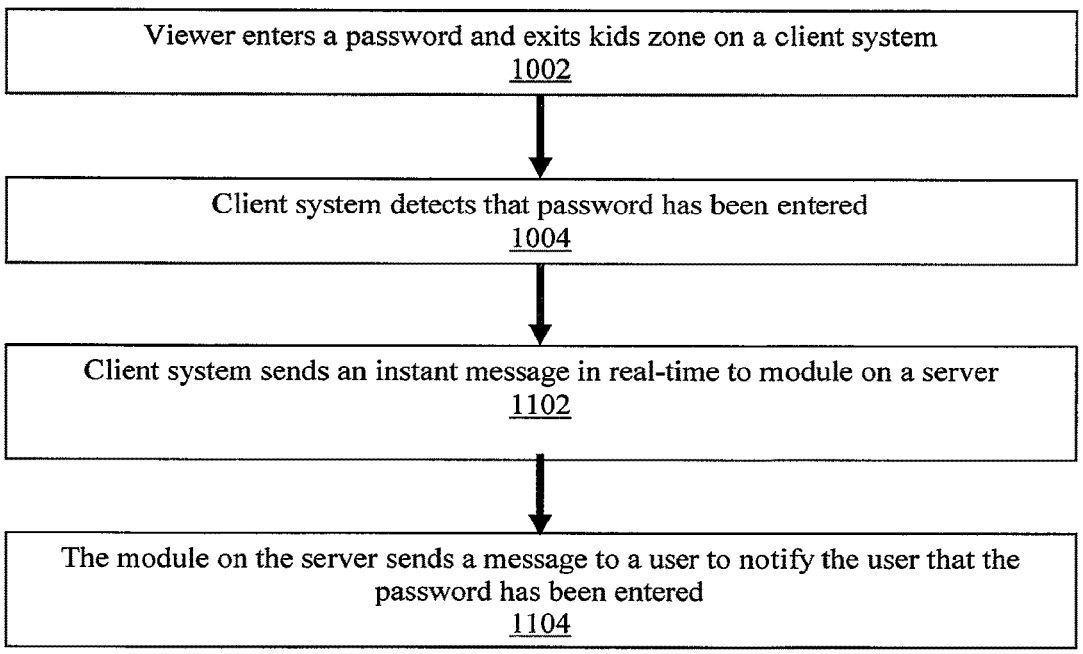
FIG. 11 is a flow diagram of a password detecting and reporting process according to an embodiment.

In an embodiment and referring to FIG. 11, a flow diagram of a password detecting and reporting process according to an embodiment, a viewer enters a password and exits a first operation mode (e.g., kids zone) on a client system (Step 1002). Upon detecting that the correct password has been submitted (Step 1004), the client system sends an instant message in real-time to a module residing on a server (Step 1102). Real-time DVR usage and reporting module 410 is an example of such server. The module residing on the server sends a message in real-time to a user (e.g., a parent) to notify the user that the password has been entered (Step 1104). It should be appreciated that the viewer may perform any activity for which the client system is configured to detect and that the activity is not limited to entering a password. It should be appreciated that the client system may be configured to detect any type of change, such as switching from a first operation mode into a second operational mode. For example, DVR 102 may be configured to detect exiting out of kids zone and into standard operation mode. It should be appreciated that the module on the server may send an instant message in real-time to another client system (e.g., a second DVR), a personal computer, a portable device, or to a server. For example, real-time DVR usage and reporting module 410 may send an instant message in real-time to a parent viewing a video program on a second DVR which is configured to display a notification message in response to receiving the instant message. In another example, real-time DVR usage and reporting module 410 may send an instant message in real-time to a parent's cellular phone that is configured to receive the instant message and alert the parent (e.g., by making a sound or vibrating) that the password has been entered. It should be appreciated that such illustrations are by way of example only and are not meant to be limiting.

An Example—R-Rated Video Program Playing Detection in Real-Time

Many of the households in which DVRs are used also are those in which children are present. Parents who own DVRs might not want their children to watch certain televised content due to the violent or mature nature of that content, among other possible reasons. However, such parents might also want their DVRs to record such content for the parents alone to watch in privacy, despite the parents' desire to prevent their children from viewing such content. Thus, in some cases, a DVR might have, stored thereon, content that the parents wanted the DVR to record, but which the parents do not want their children to view.

Several schemes have been devised for preventing children from viewing selected televised content. One such scheme involves the "V-chip" technology. The V-chip allows parents to block certain kinds of television programming that the parents don't want their children to watch. Most television programs are now assigned a rating according to a system established by the broadcasting industry. The rating is encoded with the program so that, using the remote control, parents can program the V-chip to prevent a television from displaying programs that are associated with certain ratings.

In 1996, The U.S. Congress asked the broadcasting industry to establish a voluntary ratings system for TV programs. The industry did so by creating the ratings system known as "TV Parental Guidelines." This system was established by the National Association of Broadcasters, the National Cable Television Association, and the Motion Picture Association of America (MPAA). Ratings established under this system appear in the corner of a television screen during the first 15 seconds of each program. The ratings are also included in many magazines and newspapers that provide TV listings. Ratings are given to all television programming except news, sports, and unedited movies on premium cable channels. Under this system, there are six possible ratings. TV-Y (All Children), found only in children's shows, means that the show is appropriate for all children. TV-7 (Directed to Older Children), found only in children's shows, means that the show is most appropriate for children age 7 and up. TV-G (General Audience) means that the show is suitable for all ages but is not necessarily a children's show. TV-PG (Parental Guidance Suggested) means that parental guidance is suggested and that the show may be unsuitable for younger children. This rating may also include a V for violence, an S for sexual situations, an L for language, and/or a D for suggestive dialogue. TV-14 (Parents Strongly Cautioned) means that the show may be unsuitable for children under 14. A letter such as V, S, L, or D may accompany a rating of TV-14. TV-MA (Mature Audience Only) means that the show is for mature audiences only and may be unsuitable for children under 17. A letter such as V, S, L, or D may accompany a rating of TV-MA. Similarly, ratings given to movies by the MPAA include G-rating for general audiences, PG-rating for parental guidance suggested, PG-13 for parents strongly cautioned, R-rating for restricted (children under 17 years old require an accompanying parent or adult guardian), and NC-17 for no one under 17 years old is admitted.

Figure 12:
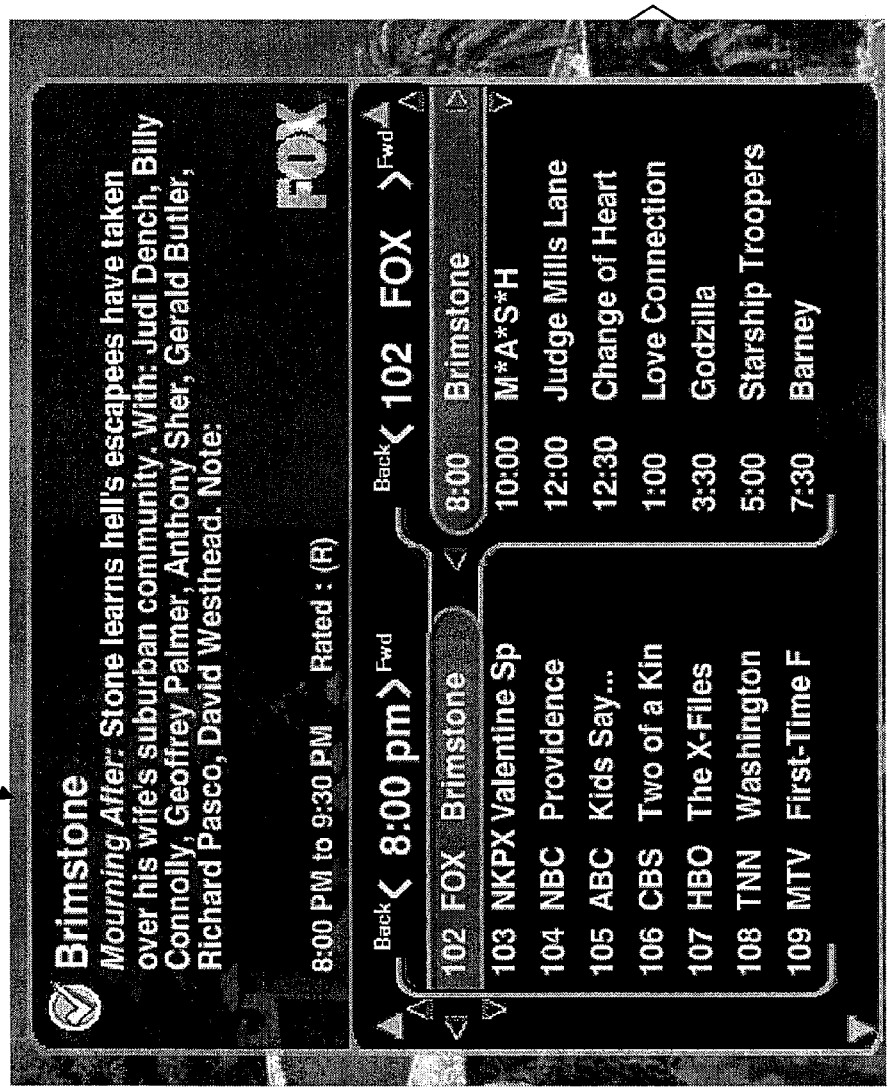
FIG. 12 illustrates an example of a DVR-presented Electronic Program Guide (EPG) screen, according to an embodiment.

In an embodiment, DVR 102 provides an interface to a DVR-presented Electronic Program Guide (EPG). An example EPG screen 1200 through which a viewer may browse is shown in FIG. 12. An example of an EPG is described in U.S. Pat. No. 6,642,939 entitled "MULTIMEDIA SCHEDULE PRESENTATION SYSTEM", owned by the Applicant and incorporated by reference herein in its entirety. For example, in response to a viewer's selection (e.g., using the DVR remote control) of a content item that is identified in the EPG, DVR 102 presents a screen that shows detailed information about the selected content item. The detailed information may include the content item's title, a description of the content item's subject matter (e.g., plot), the year in which the content item was produced, the content item's rating, third-party reviews of the content item, etc.

Figure 13:
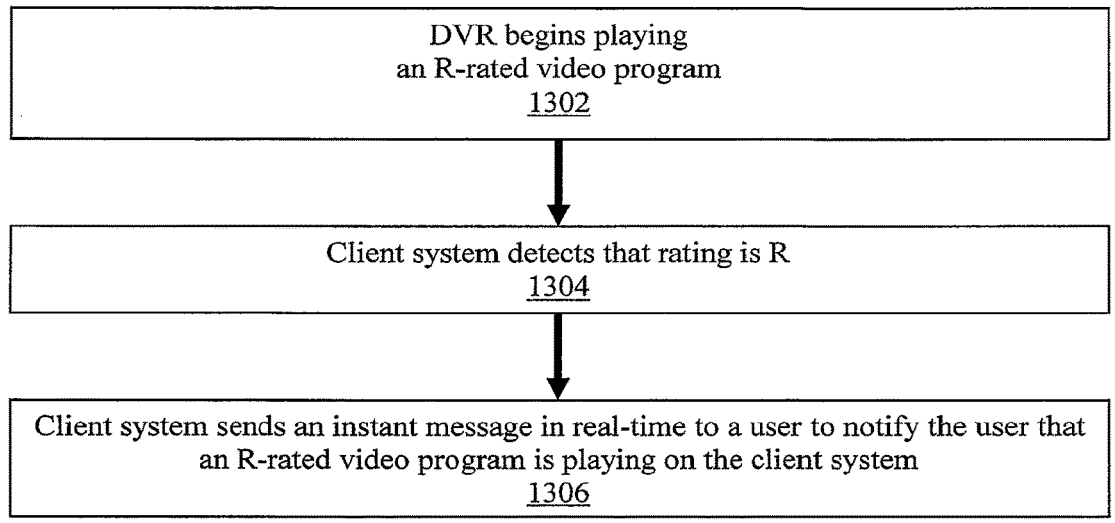
FIG. 13 a flow diagram of a rating-detecting and reporting process, according to an embodiment.

An embodiment may be described with reference to FIG. 13, a flow diagram of a rating-detecting and reporting process, and FIG. 12. In an embodiment, a viewer begins viewing content or the DVR, perhaps previously programmed, begins playing content (Step 1302), e.g., chosen from the R-rated program, Brimstone, on screen 1200, on a client system (e.g., DVR 102). The client system detects that the rating is R (Step 1304). The client system sends an instant message in real-time to a user (e.g., a parent) to notify the user that an R-rated video movie is playing on the client system (Step 1306). It should be appreciated that the viewer may perform any activity for which the client system is configured to detect and that the activity is not limited to viewing particular content. It should be appreciated that the client system may be configured to detect any type of activity, such as, for example, playing a video program, video movie, or music, of any rating. As well, the client system may be configured to detect any other program guide information related to the media content being played. For example, DVR 102 may be configured to detect a viewer watching a TV-14-rated video program. It should be appreciated that the client system may send an instant message in real-time to another client system (e.g., a second DVR), a personal computer, a portable device, or to a server. For example, DVR 102 may send an instant message in real-time to a parent viewing a video program on a second DVR which is configured to display a notification message in response to receiving the instant message. In another example, DVR 102 may send an instant message in real-time to a parent's cellular phone that is configured to receive the instant message and alert the parent (e.g., by making a sound or vibrating) that the viewer is watching a particular content, such as a TV-14-rated video program. It should be appreciated that such illustrations are by way of example only and are not meant to be limiting.

Figure 14:
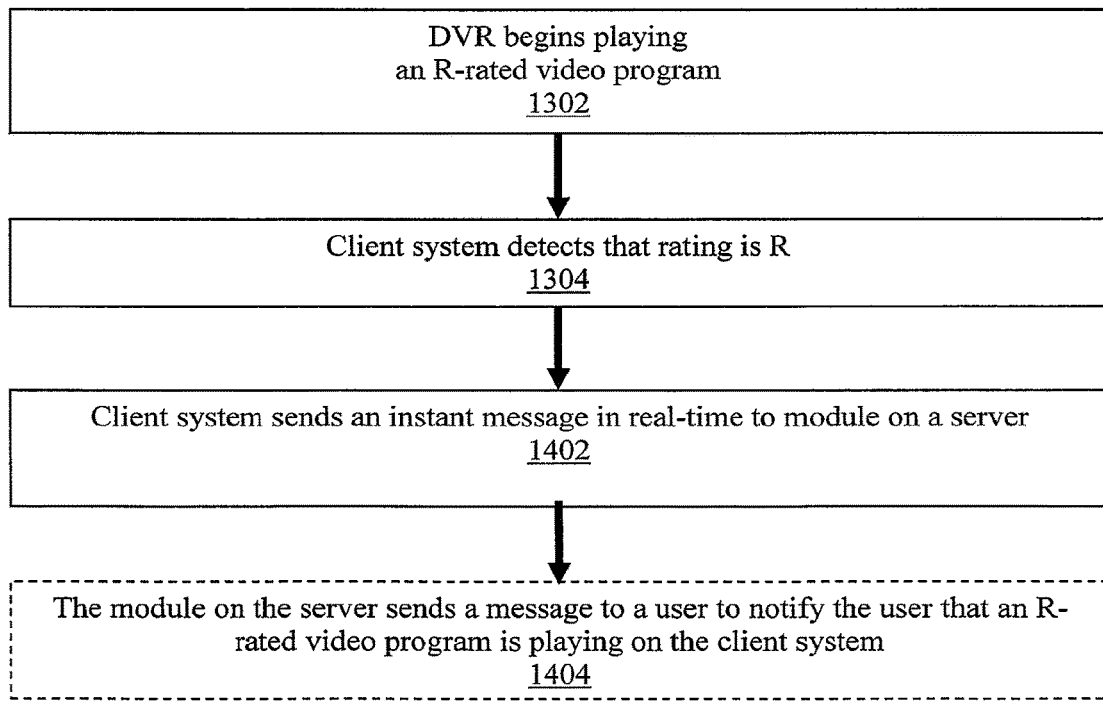
FIG. 14 a flow diagram of a rating-detecting and reporting process, according to an embodiment.

An embodiment may be described with reference to FIG. 14, a flow diagram of a rating-detecting and reporting process, and FIG. 12. In an embodiment, a viewer begins viewing content or the DVR, perhaps previously programmed, begins playing content (Step 1302), e.g., chosen from the R-rated program, Brimstone, on screen 1200, on a client system (e.g., DVR 102). The client system detects that the rating is R (Step 1304). The client system sends an instant message in real-time to a module on a server (Step 1402). Real-time DVR usage and reporting module 410 is an example of such server. Real-time DVR usage and reporting module 410 may perform post-processing in response to receiving the instant message indicating that the client system detects that the rating is R. Optionally, the module on the server sends a message in real-time to the user to notify the user that an R-rated video program is playing on the client system (Step 1404). It should be appreciated that the client system may execute any activity for which the client system is configured to detect and that the activity is not limited to a viewer viewing particular content. It should be appreciated that an activity can be performed without any viewer present and for which the client system is configured to detect. For example, DVR 102 may be configured to detect playing a TV-14-rated video program. It should be appreciated that the server may send an instant message in real-time to another client system (e.g., a second DVR), a personal computer, a portable device, to a server, or may perform any other post-processing. For example, real-time DVR usage and reporting module 410 may send an instant message in real-time to a parent viewing a video program on a second DVR which is configured to display a notification message in response to receiving the instant message. In another example, real-time DVR usage and reporting module 410 may send an instant message in real-time to a parent's cellular phone that is configured to receive the instant message and alert the parent (e.g., by making a sound or vibrating) that viewer is watching an R-rated video movie. In another example, real-time DVR usage and reporting module 410 may only make an entry in a log file, where the entry is associated with the activity being performed on DVR 102. It should be appreciated that such illustrations are by way of example only and are not meant to be limiting.

Hardware Overview

FIG. 15 is a block diagram that illustrates a computer system 1500 upon which an embodiment may be implemented. Computer system 1500 includes a bus 1502 or other communication mechanism for communicating information, and a processor 1504 coupled with bus 1502 for processing information. Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

The invention is related to the use of computer system 1500 for real-time DVR usage detecting and reporting. According to one embodiment, real-time DVR usage detecting and reporting is provided by computer system 1500 in response to processor 1504 executing one or more sequences of one or more instructions contained in main memory 1506. Such instructions may be read into main memory 1506 from another computer-readable medium, such as storage device 1510. Execution of the sequences of instructions contained in main memory 1506 causes processor 1504 to perform the process steps described herein. One or more processors in a multi-processing arrangement may also be employed to execute the sequences of instructions contained in main memory 1506. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing instructions to processor 1504 for execution. Such a medium may take many forms, including but not limited to, non-volatile media, volatile media, and transmission media. Non-volatile media includes, for example, optical or magnetic disks, such as storage device 1510. Volatile media includes dynamic memory, such as main memory 1506. Transmission media includes coaxial cables, copper wire and fiber optics, including the wires that comprise bus 1502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1504 for execution. For example, the instructions may initially be carried on a magnetic disk of a remote computer. The remote computer can load the instructions into its dynamic memory and send the instructions over a telephone line using a modem. A modem local to computer system 1500 can receive the data on the telephone line and use an infrared transmitter to convert the data to an infrared signal. An infrared detector coupled to bus 1502 can receive the data carried in the infrared signal and place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the worldwide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are exemplary forms of carrier waves transporting the information.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. In accordance with the invention, one such downloaded application provides for real-time DVR usage detecting and reporting as described herein.

The received code may be executed by processor 1504 as it is received, and/or stored in storage device 1510, or other non-volatile storage for later execution. In this manner, computer system 1500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for notifying users that an operational state of a given device has changed, the method comprising:
    receiving, at a server, a first notification, wherein the first notification indicates that the operational state of a first device, associated with a first user, has changed from a first operational state to a second operational state and further indicates data corresponding to the first user require synchronization of the change in the operational state of the first device, wherein the first device maintains an SSL connection with the server;
    in response to receiving the first notification, retrieving, at the server, a first set of synchronization data from the first device corresponding to the change in the operational state of the first device, associated with the first user;
    polling, at the server, the first device to determining whether the SSL connection has failed;
    in response to determining that the SSL connection has failed:
        storing, at the server, a second notification, indicating that the operational state of the first device has changed from the first operational state to the second operational state;
        storing, at the server, the first set of synchronization data;
        reconnecting the SSL connection; and
        polling, at the server, the first device to determining whether the SSL connection is reconnected;
    in response to determining that the SSL connection is reconnected:
        synchronizing, at the server, the first set of synchronization data with a second set of synchronization data stored on a storage device, wherein the second set of synchronization data is associated with the first user;
        retrieving, at the server, from the first notification, an identifier for a second user that has to be notified of the change in the operational state of the first device;
        determining, at the server, based on the identifier for the second user, a second device associated with the second user; and
        transmitting, from the server, to the second device the second notification.

2. The method of claim 1, wherein the operational state of the first device changes from the first operational state to the second operational state in response to a password being received at the first device.

3. The method of claim 1, wherein the second notification is transmitted in real-time upon receiving the first notification.

4. The method of claim 1, wherein the first device is a DVR.

5. The method of claim 1, wherein the second device is any of a DVR, a personal computer, a portable device and another server.

6. The method of claim 1, wherein the second notification is at least one of an instant message, a text message and an email.

7. The method of claim 1, further comprising:
    in response to receiving the first notification, determining, at the server, whether a database associated with the first device includes an entry associated with change in operational state of the first device;
    in response to determining that the database associated with the first device includes the entry associated with change in operational state of the first device, updating the entry in the database associated with the first device; and
    in response to determining that the database associated with the first device does not include the entry associated with change in operational state of the first device, adding the entry to the database associated with the first device.

8. The method of claim 1, further comprising:
determining, at the server, based on the identifier for the user, a third device associated with the user; and
transmitting, from the server, to the third device a third notification indicating that the operational state of the first device has changed from the first operational state to the second operational state.

9. The method of claim 1, further comprising:
receiving, at the server, a third notification, wherein the third notification indicates that a media asset with a particular content rating is being played back at the first device; and
transmitting, from the server, to the second device a fourth notification indicating that the media asset with the particular content rating is being played back at the first device.

10. The method of claim 1, further comprising:
in response to receiving the first notification and prior to retrieving the identifier for the user, accessing a data structure of rules that includes a rule specifying an action to be taken in response to receiving the first notification; and
determining, based on the rule, that a specific user has to be notified of the change in the operational state of the first device.

11. A system for notifying users that an operational state of a given device has changed, the system comprising:
control circuitry configured to:
receive, at a server, a first notification, wherein the first notification indicates that the operational state of a first device, associated with a first user, has changed from a first operational state to a second operational state and further indicates data corresponding to the first user require synchronization of the change in the operational state of the first device, wherein the first device maintains an SSL connection with the server;
in response to receiving the first notification, retrieve, at the server, a first set of synchronization data from the first device corresponding to the change in the operational state of the first device, associated with the first user;
poll the first device to determining whether the SSL connection has failed;
in response to determining that the SSL connection has failed:
store, at the server, a second notification, indicating that the operational state of the first device has changed from the first operational state to the second operational state;
store, at the server, the first set of synchronization data;
reconnect the SSL connection; and
poll, at the server, the first device to determining whether the SSL connection is reconnected;
in response to determining that the SSL connection is reconnected:
synchronize, at the server, the first set of synchronization data with a second set of synchronization data stored on a storage device, wherein the second set of synchronization data is associated with the first user;
retrieve, at the server, from the first notification, an identifier for a second user that has to be notified of the change in the operational state of the first device;
determine, at the server, based on the identifier for the second user, a second device associated with the second user; and
transmit, from the server, to the second device the second notification.

12. The system of claim 11, wherein the operational state of the first device changes from the first operational state to the second operational state in response to a password being received at the first device.

13. The system of claim 11, wherein the second notification is transmitted in real-time upon receiving the first notification.

14. The system of claim 11, wherein the first device is a DVR.

15. The system of claim 11, wherein the second device is any of a DVR, a personal computer, a portable device and another server.

16. The system of claim 11, wherein the second notification is at least one of an instant message, a text message and an email.

17. The system of claim 11, wherein the control circuitry is further configured to:
in response to receiving the first notification, determine, at the server, whether a database associated with the first device includes an entry associated with change in operational state of the first device;
in response to determining that the database associated with the first device includes the entry associated with change in operational state of the first device, update the entry in the database associated with the first device; and
in response to determining that the database associated with the first device does not include the entry associated with change in operational state of the first device, add the entry to the database associated with the first device.

18. The system of claim 11, wherein the control circuitry is further configured to:
determine, at the server, based on the identifier for the user, a third device associated with the user; and
transmit, from the server, to the third device a third notification indicating that the operational state of the first device has changed from the first operational state to the second operational state.

19. The system of claim 11, wherein the control circuitry is further configured to:
receive, at the server, a third notification, wherein the third notification indicates that a media asset with a particular content rating is being played back at the first device; and
transmit, from the server, to the second device a fourth notification indicating that the media asset with the particular content rating is being played back at the first device.

20. The system of claim 11, wherein the control circuitry is further configured to:
in response to receiving the first notification and prior to retrieving the identifier for the user, access a data structure of rules that includes a rule specifying an action to be taken in response to receiving the first notification; and
determine, based on the rule, that a specific user has to be notified of the change in the operational state of the first device.

* * * * *